US010450503B2

United States Patent
Gupta et al.

(10) Patent No.: US 10,450,503 B2
(45) Date of Patent: Oct. 22, 2019

(54) METHODS OF USING LIGHTWEIGHT POLYMERS DERIVED FROM CASHEW NUT SHELL LIQUID IN HYDRAULIC FRACTURING AND SAND CONTROL OPERATIONS

(71) Applicants: D. V. Satyanarayana Gupta, The Woodlands, TX (US); Syed Mohammad Ali, Spring, TX (US); Anthony Stonis, Naples, FL (US)

(72) Inventors: D. V. Satyanarayana Gupta, The Woodlands, TX (US); Syed Mohammad Ali, Spring, TX (US); Anthony Stonis, Naples, FL (US)

(73) Assignee: BAKER HUGHES, LLC, Houston, TX (US)

( * ) Notice: Subject to any disclaimer, the term of this patent is extended or adjusted under 35 U.S.C. 154(b) by 413 days.

(21) Appl. No.: 15/173,851

(22) Filed: Jun. 6, 2016

(65) Prior Publication Data
US 2017/0349812 A1    Dec. 7, 2017

(51) Int. Cl.
| | |
|---|---|
| *E21B 43/04* | (2006.01) |
| *E21B 43/26* | (2006.01) |
| *E21B 43/267* | (2006.01) |
| *C09K 8/56* | (2006.01) |
| *C09K 8/62* | (2006.01) |
| *C09K 8/80* | (2006.01) |

(Continued)

(52) U.S. Cl.
CPC ............ *C09K 8/80* (2013.01); *C09K 8/565* (2013.01); *C09K 8/575* (2013.01); *C09K 8/5756* (2013.01); *C09K 8/64* (2013.01); *C09K 8/68* (2013.01); *C09K 8/685* (2013.01); *C09K 8/70* (2013.01); *C09K 2208/04* (2013.01)

(58) Field of Classification Search
CPC ..... E21B 43/267; C09K 8/80; C09K 2208/04; C09K 8/565; C09K 8/575; C09K 8/5756; C09K 8/64; C09K 8/68; C09K 8/685; C09K 8/70

See application file for complete search history.

(56) References Cited

U.S. PATENT DOCUMENTS 5,051,454 A * 9/1991 Lemon ................. B22C 1/2253
523/146
5,218,038 A * 6/1993 Johnson ................. C09K 8/805
524/541

(Continued)

FOREIGN PATENT DOCUMENTS

WO    2009005880 A2    1/2009

OTHER PUBLICATIONS

Bhunia et al., "Synthesis and characterization of polymers from cashewnut shell liquid: a renewable resource V. Synthesis of copolyester", European Polymer Journal 36 (2000), pp. 1157-1165.

(Continued)

*Primary Examiner* — Daniel P Stephenson
(74) *Attorney, Agent, or Firm* — Cantor Colburn LLP (57) ABSTRACT

A method of fracturing a subterranean formation includes introducing into the formation a fracturing composition comprising a carrier and a polymeric particulate derived from a cashew nut shell liquid, the polymeric particulate having an apparent specific gravity of less than about 2.4. The fracturing composition is introduced at a pressure sufficient to create or enlarge a fracture in the formation.

25 Claims, 1 Drawing Sheet

(51) Int. Cl.
  *C09K 8/565* (2006.01)
  *C09K 8/575* (2006.01)
  *C09K 8/64* (2006.01)
  *C09K 8/68* (2006.01)
  *C09K 8/70* (2006.01)

(56) References Cited

U.S. PATENT DOCUMENTS

| | | |
|---|---|---|
| 7,931,087 B2 | 4/2011 | Gupta |
| 8,127,849 B2 | 3/2012 | Gupta |
| 8,461,087 B2 | 6/2013 | Bicerano |
| 2007/0144736 A1 | 6/2007 | Shinbach et al. |
| 2016/0075940 A1 | 3/2016 | Rappolt |
| 2016/0130498 A1 | 5/2016 | Afanasiev et al. |
| 2017/0349812 A1* | 12/2017 | Gupta .............. C09K 8/80 |
| 2017/0349814 A1* | 12/2017 | Gupta .............. C09K 8/56 |
| 2019/0055459 A1 | 2/2019 | Zelenev et al. |

OTHER PUBLICATIONS

Ilomo, et al. "Micron-Sized Polymer Particles From Tanzanian Cashew Nut Shell Liquid. Part I: Reparation, Functionalization With Chloroacetic Acid and Utilization as Cation Exchange Resin", Bull. Chem. Soc. Ethiop. 2004, 18(1); pp. 81-90.

Mkayula et al., "Preparations of Spherical Polymeric Particles from Tanzania Cashew Nut Shell Liquid by Suspension Polymerization", Tanzania Journal of Science, vol. 30, No. 2, 2004, pp. 1-10.

International Search Report, International Application No. PCT/US2017/035886, dated Sep. 13, 2017, Korean Intellectual Property Office; International Search Report 4 pages.

International Written Opinion, International Application No. PCT/US2017/035886, dated Sep. 13, 2017, Korean Intellectual Property Office; International Written Opinion 8 pages.

Makame et al. "Micron-Sized Polymeric Particles From Cashew Nut Shell Liquid: Influence of Reaction Parameters on Particle Size", Tanz. J. Sci. vol. 31(1) 2005; 9 pages.

* cited by examiner

METHODS OF USING LIGHTWEIGHT POLYMERS DERIVED FROM CASHEW NUT SHELL LIQUID IN HYDRAULIC FRACTURING AND SAND CONTROL OPERATIONS

BACKGROUND

This disclosure is directed to methods for treating subterranean formations, such as hydraulic fracturing treatments and sand control, and in particular, use of lightweight polymers derived from cashew nut shell liquid as proppant material in hydraulic fracturing treatments or as particulate material in sand control methods such as gravel packing and frac pack treatments.

Hydraulic fracturing increases the flow of desirable fluids such as oil and gas from a subterranean formation and involves placing a fracturing fluid into a subterranean formation or zone at a rate and pressure sufficient to impart a stress in the formation or zone with attendant production of a fracture in the formation or zone.

Beyond creating the fracture, the fracturing fluid also transports a proppant into the fracture. The proppant keeps the fracture open after release of the exerted pressure. Further, the proppant establishes conductive means in which the formation fluids flow to the borehole. Since the proppant provides a higher conductivity than the surrounding rock, the fracture has greater potential for production of hydrocarbons.

Proppants used in the art include sand, glass beads, walnut hulls, and metal shot as well as polymer-coated sands, ceramics, sintered bauxite, and the like. In order to withstand high pressures downhole, the proppants must be of sufficient strength. The relative strength of proppants increases with their corresponding apparent specific gravity (ASG), typically ranging from 2.65 for sands to 3.4 for sintered bauxite. Unfortunately, increasing ASG leads directly to increasing degree of difficulty with proppant transport and reduced propped fracture volume, thereby reducing fracture conductivity.

More recently, ultra lightweight (ULW) materials have been used as proppants since they reduce the fluid velocity required to maintain proppant transport within the fracture, which, in turn, provides for a greater amount of the created fracture area to be propped. Despite all the advances in the art, there is a need for alternative lightweight proppants that exhibit high particle strength under high pressures. It would be a further advantage if such lightweight proppants have good chemical resistance and are stable at high temperatures.

BRIEF DESCRIPTION

A method of fracturing a subterranean formation comprises introducing into the formation at a pressure sufficient to create or enlarge a fracture in the formation a fracturing composition comprising a carrier and a polymeric particulate derived from a cashew nut shell liquid, the polymeric particulate having an apparent specific gravity of less than about 2.4.

A method of fracturing a subterranean formation comprises introducing into the formation a fracturing composition containing a carrier and a polymeric particulate derived from a cashew nut shell liquid at a pressure sufficient to create or enlarge a fracture in the formation, the polymeric particulate having an apparent specific gravity of less than about 2.4; and forming in the created fracture a proppant pack comprising the polymeric particulate, wherein the proppant pack is permeable to fluids produced from the wellbore and substantially prevents or reduces production of formation materials from the formation into the wellbore.

A sand control method for a wellbore penetrating a subterranean formation comprises introducing into the wellbore a slurry of a polymeric particulate derived from a cashew nut shell liquid and a carrier fluid, the polymeric particulate having an apparent specific gravity of less than about 2.4; and placing the polymeric particulate adjacent the subterranean formation to form a fluid-permeable pack capable of reducing or substantially preventing the passage of formation particles from the subterranean formation into the wellbore while allowing passage of formation fluids from the subterranean formation into the wellbore.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have discovered that lightweight and/or substantially neutrally buoyant polymeric proppant or sand control particulates (collectively "particulates") derived from cashew nut shell liquids have excellent chemical resistance and are stable at temperatures up to about 450° C. In particular, the polymeric particulates derived from cashew nut shell liquids can have a glass transition temperature of up to about 450° C. Further, the polymeric particulates derived from cashew nut shell liquids can have less than 1% solubility in acids such as hydrofluoric acid and hydrochloric acid at a temperature of 150° F. The polymeric particulates also exhibit excellent crush strength, commonly known as crush resistance. In particular, the polymeric particulates exhibit a fines production of 5% or less, 3% or less, or 2% or less, as a measure of crush strength in accordance with American Petroleum Institute (API) RP60 at closure pressures ranging from 6,000 to 16,000 psi, including at specific closure pressures of 6,000 psi, 8,000 psi, 10,000 psi, 12,000 psi, 14,000 psi, and 16,000 psi.

The lightweight polymeric particulates derived from cashew nut shell liquids are characterized by an apparent specific gravity (ASG) (API RP 60) which is substantially less than the ASG of a conventional particulate material employed in hydraulic fracturing or sand control operations. In some embodiments the polymeric particulates derived from cashew nut shell liquids have an apparent specific gravity of less than about 2.4. In other embodiments, the lightweight polymeric particulates as used herein can have an apparent specific gravity of less than about 2, less than about 1.5, about 0.5 to about 2, or about 0.5 to about 1.5.

The polymeric particulates derived from cashew nut shell liquids can have a bulk density of from about 0.05 to about 2.0 g/cm$^3$, alternatively from about 0.1 to about 1.0 g/cm$^3$, according to API Recommended Practices RP60 for testing proppants. Further, the polymeric particulates derived from cashew nut shell liquids can have an apparent density of from about 0.1 to about 3.0 g/cm$^3$, about 0.5 to about 2 g/cm$^3$ or about 0.5 to about 1.5 g/cm$^3$, according to API Recommended Practices RP60 for testing proppants.

As used herein, a cashew nut shell liquid ("CNSL") refers to a liquid isolated from cashew nut shells. The major component of natural or raw CNSL is anacardic acid, a hydroxy carboxylic acid with an alkyl substituent meta to the hydroxy functionality. The natural or raw CNSL can be further processed to provide distilled CNSL. Distilled CNSL can contain cardanol of formula (1), cardol of formula (2), 2-methyl cardol of formula (3), and anarcardic acid of formula (4):

wherein in formulas (1)-(4), R is $C_{15}H_{31-n}$, and n is 0, 2, 4, or 6. The alkyl chain R has 15 carbons and can be a mixture of saturated, monoene, diene, and triene or any combination thereof. Other minor components can also be present. Depending on the processing conditions, the components as well as the percentages of the components of CNSL can vary. In an embodiment, the CNSL is a distilled CNSL which contains greater than about 50 wt. % of the cardanol of formula (1), greater than about 60 wt. % of the cardanol of formula (1), greater than about 70 wt. % of the cardanol of formula (1), or greater than about 80 wt. % of the cardanol of formula (1). Natural and distilled cashew nut shell liquids are commercially available from CARDOLITE. Both natural and distilled cashew nut shell liquids can be used to produce the polymeric particulates.

Because of the phenolic nature of the components in CNSL and the presence of an alkyl chain with a variable degree of unsaturation, CNSL can be subjected to polymerization to provide various polymeric products. Polymers derived from CNSL can be prepared by condensation with electrophilic compounds such as formaldehyde, or by chain polymerization through the unsaturation in the side chain, or functionalization at the hydroxyl group and subsequently oligomerization or polymerization to obtain functionalized prepolymer or polymer. Methods to prepare polymers from CNSL are known and have been described for example in Bull. Chem. Soc. Ethiop. 2004, 18(1), 81-90, Tanz. J. Sci. Vol 30(2) 2004, and European Polymer Journal 36 (2000) 1157-1165.

As used herein, the polymeric particulates derived from CNSL can include a thermoset polymer or a thermoplastic polymer. The polymers can be homopolymers, copolymers, or branched polymers. Combinations of the materials can be used.

In some embodiments the polymeric particulates comprise a phenol formaldehyde derived from CNSL, a polyester derived from CNSL, or a combination comprising at least one of the foregoing.

The phenol formaldehyde can be manufactured by reacting CNSL such as a distilled CNSL with formaldehyde. Any methods known in the art to produce phenol formaldehyde polymers can be used. In an embodiment, CNSL and formaldehyde react directly to produce a thermosetting network polymer. Alternatively, CNSL is reacted with formaldehyde to produce a prepolymer such as novolac, which is then cured. Novolacs are phenol-formaldehyde resins with a formaldehyde to phenol molar ratio of less than one. A hardner such as hexamethylenetetramine or "hexamine" can be used to crosslink or cure novolac. In some embodiments, novolac cures forming methylene and dimethylene amino bridges.

The polyesters can be polyester homopolymers, copolyesters, or branched polyesters. Suitable polyesters are derived from a diacid or a chemical equivalent thereof and a diol or a chemical equivalent thereof.

Examples of diacids include terephthalic acid, isophthalic acid, 1,4-naphthalenedicarboxylic acid, 1,5-naphthalenedicarboxylic acid, 2,6-naphthalenedicarboxylic acid, norbornene dicarboxylic acids, 1,4-cyclohexanedicarboxylic acids, or a combination comprising at least one of the foregoing. Chemical equivalents of diacids include dialkyl esters, e.g., dimethyl esters, diary' esters, anhydrides, salts, acid chlorides, acid bromides, and the like. Terephthalic acid, isophthalic acid, a derivative thereof such as terephthaloyl chloride or isophthaloyl chloride is specifically mentioned. Combinations of different acids or derivatives thereof can be used.

Examples of diols include a bisphenol derived from CNSL, resorcinol, hydroquinone, or pyrocatechol, as well as diols such as 1,5-naphthalene diol, 2,6-naphthalene diol, 1,4-naphthalene diol, 4,4'-dihydroxybiphenyl, bis(4-hydroxyphenyl) ether, bis(4-hydroxyphenyl) sulfone, branched, or cycloaliphatic alkane diols such as propylene glycol, i.e., 1, 2- and 1,3-propylene glycol, 2,2-dimethyl-1, 3-propane diol, 2-ethyl-2-methyl-1,3-propane diol, 2,2,4,4-tetramethyl-cyclobutane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol, and the like, and combinations comprising at least of the foregoing diols. Chemical equivalents of diols include esters, for example, dialkylesters.

Preferably the diol is derived from CNSL. CNSL is a natural product from cashew trees. Cardol and 2-methyl cardol in CNSL are diols and can be used directly to prepare polyesters. Cardanol in CNSL is a monohydroxy phenol and can be converted to a bisphenol such as 4-[(4-hydroxy-2-pentadecenyl-phenyl)diazenyl] phenol (HPPDP) before polymerizing with a diacid or a derivative thereof to prepare a polyester. The process to covert cardanol to HPPDP is known and has been described, for example, in European Polymer Journal 36 (2000) 1157-1165. In an embodiment, the polyester is a copolyesters derived from a combination of 1,4-butane diol and HPPDP with terephthalic acid, isophthalic acid, or a derivative thereof. An exemplary process to prepare the copolyesters is described in European Polymer Journal 36 (2000) 1157-1165.

If desired, other materials can be used together with the polymers derived from CNSL to further adjust the properties of the particulates. In an embodiment, the lightweight polymeric particulates comprise greater than about 50 wt. %, greater than an about 70 wt. %, greater than about 80 wt. %, or greater than about 90 wt. % of a polymer derived from CNSL, based on the total weight of the lightweight polymeric particulates.

The polymeric particulates may be of any size or shape suitable for hydraulic fracturing and sand control methodology. Mixtures or blends of particulates having differing, but suitable, shapes for use in the disclosed method further can be employed. In an embodiment, the polymeric particulates are substantially spherical, such as being beaded, or pelleted.

The lightweight and/or substantially neutrally buoyant polymeric particulates derived from cashew nut shell liquids can have a particle size ranging from about 1 mesh to about 200 mesh, about 5 mesh to about 100 mesh, about 10 mesh to about 70 mesh, or about 20 mesh to about 50 mesh. Particle size of the disclosed particulate materials may be selected based on factors such as anticipated downhole conditions and/or on relative strength or hardness of the particulate material/s selected for use in a given application. Larger particle sizes may be more desirable in situations where a relatively lower strength particulate material is employed. For example, 12/20 mesh polymeric particulates may be desirable for use where closure stresses of up to about 1500 psi are anticipated. Smaller particle sizes may be more desirable in situations where a relatively higher strength particulate material is employed. For example 20/40 mesh or 30/50 mesh polymeric particulates may be desirable for use where closure stresses of up to about 16,000 psi.

Optionally, the polymeric particulates derived from cashew nut shell liquids can be used in conjunction with proppant known in the art including but not limited to sand.

The polymeric particulates derived from cashew nut shell liquids may be used in conjunction with one or more fillers to form a well treating composite. Such fillers are non-reactive and further serve to increase the strength and temperature stability of the polymer composite as well as to modify the density of the particulate.

The presence of such fillers further render a well treating composite having an ASG different than the ASG of the polymeric particulate derived from cashew nut shell liquids. Volume proportions of filler may be selected so as to control crush strength and temperature stability. Typically, the particle size of the filler range from about 100 nm to about 200 μm.

Exemplary fillers are minerals (such as finely divided minerals or finely divided minerals and/or fibers) optionally bound by a suitable organic or inorganic binder. Suitable minerals include fly ash, silica and sand (including fumed silica, quartz sand, and silica flour), alumina, mica, silicates, such as orthosilicates and metasilicates, aluminum silicate and calcium silicate, kaolin, talc, zirconia, boron and glass, such as glass spheres (especially glass microspheres), glass powder, glass beads, glass bubbles, ground glass, borosilicate glass and fiberglass. Suitable fibers include mineral fibers, glass fibers, ceramic fibers, carbon fibers, polymeric fibers, coated fibers (such as nickel coated carbon fibers) and synthetic fibers. Further, suitable fillers include clay, hematite, alkali metal salts, molybdenum disulfide, oil, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides (such as trimanganese tetraoxide), metallic salts (including alkali metal salts), phosphates, borates, calcium carbonate, calcium chloride, calcium bromide, barium sulfate, aluminum flakes, a modified naturally occurring material, crushed nut shells, ground or crushed seed shells, ground or crushed fruit pits, processed wood and organic polymeric materials. Further, the filler may contain a cation selected from the group consisting of alkali metals, alkaline earth metals, ammonium, manganese, and zinc and an anion selected from the group consisting of a halide, an oxide, a carbonate, nitrate, sulfate, acetate and formate.

The amount of filler in the composite is such as to impart to the well treating composite the desired ASG. Typically, the amount of filler in the well treating composite is between from about 1 to about 85, more typically between from about 25 to about 60, percent by volume of the well treating composite. The amount of filler and polymeric particulate may be adjusted to tailor the composite to achieve the desirable physical properties, including particle density, bulk density, crush strength, etc.

The well treating composites are generally prepared by blending the polymeric particulate derived from cashew nut shell liquids with the selected fillers, in a molten state, and forming a composite of the desired size and physical properties. This can be achieved by known techniques in the powder/particulate industry such as melt processing, cryogenic grinding, etc.

The polymeric particulates derived from cashew nut shell liquids may be employed with a carrier in order to facilitate placement of the polymeric particulates to a desired location within the formation. The carrier can be an aqueous carrier, an oil based carrier, or an energized or emulsion fluid. The aqueous carrier includes fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from the ground. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 1 to about 0.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

A treatment fluid is considered "energized" when a compressible sometimes soluble gas phase is introduced into the treatment fluid. Examples of the gas phase are air, nitrogen, carbon dioxide, natural gas and the like, or mixtures thereof or a combination comprising at least one of the foregoing. The carrier can be foamed by inclusion of a non-gaseous foaming agent. The non-gaseous foaming agent can be amphoteric, cationic, or anionic.

The carrier may be gelled, non-gelled or have a reduced or lighter gelling requirement as compared to carrier fluids employed with conventional fracture treatment/sand control methods. The carrier can be "weakly gelled", i.e., having minimum sufficient gelling agent, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid typically contains no gelling agent or viscosifier.

The carrier or fracturing fluid may further contain one or more conventional additives to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

The polymeric particulates derived from cashew nut shell liquids may be advantageously pre-suspended as a substantially neutrally buoyant particulate and stored in the carrier fluid (e.g., brine of near or substantially equal density), and then pumped or placed downhole as is, or diluted on the fly.

The term "substantially neutrally buoyant" refers to particulates that have an ASG sufficiently close to the ASG of the selected ungelled or weakly gelled carrier fluid (e.g., ungelled or weakly gelled completion brine, other aqueous-based fluid, slick water, or other suitable fluid) which allows pumping and satisfactory placement of the proppant/particulate using the selected ungelled or weakly gelled carrier fluid.

The use of a non-gelled carrier fluid eliminates a source of potential proppant pack and/or formation damage and enhancement of well productivity. Elimination of the need to formulate a complex suspension gel may further mean a reduction in tubing friction pressures, particularly in coiled tubing and in the amount of on-location mixing equipment and/or mixing time requirements, as well as reduced costs.

In an embodiment, the lightweight polymeric particulates derived from cashew nut shell liquids are suspended in a carrier fluid and introduced into the subterranean formation at a pressure above a fracturing pressure of the subterranean formation. In this method, at least a portion of the particulate material is substantially neutrally buoyant in the carrier fluid. Further, the lightweight polymeric and/or substantially neutrally buoyant particulate derived from cashew nut shell liquids is used in a sand control method for a wellbore penetrating a subterranean formation and may be introduced into the wellbore in a slurry with a carrier fluid; the particulate material being placed adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore. In this method at least a portion of the individual particles of the particulate material may be substantially neutrally buoyant in the carrier fluid.

The polymeric particulates derived from cashew nut shell liquids are easy to place within a targeted zone due to lessened settling constraints. The reduced mass of the polymeric particulates is generally required to fill an equivalent volume than is required with conventional sand control particulates used, for example, for gravel packing purposes.

When employed in well treatments, the lightweight and/or substantially neutrally buoyant particulates may be introduced into the wellbore at any concentration deemed suitable or effective for the downhole conditions to be encountered. In a particular embodiment, the polymeric particulates derived from cashew nut shell liquids are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the composition.

The low ASG of the polymeric particulates and/or substantially neutrally buoyant polymeric particulates may result in a larger fracture or frac pack width for the same loading (i.e., pound per square foot of proppant) to give much larger total volume and increased width for the same mass. Alternatively, this characteristic allows for smaller masses of proppant or sand control particulates to be pumped while still achieving an equivalent width.

When used in hydraulic fracturing, a fracturing composition containing the polymeric particulates derived from cashew nut shell liquids can be injected at pressures sufficiently high enough to cause the formation or enlargement of fractures. The polymeric particulates may be mixed with the carrier in any manner suitable for delivering the mixture to a wellbore and/or subterranean formation.

Once a fracture is created or enlarged, the polymeric particulates derived from cashew nut shell liquids can form a proppant pack or frac pack, which is permeable to fluids produced from the wellbore and substantially prevents or reduces production of formation materials from the formation into the wellbore.

The polymeric particulates derived from cashew nut shell liquids may be employed to simplify hydraulic fracturing treatments or sand control treatments performed through coil tubing, by greatly reducing fluid suspension property requirements. When placed downhole, the polymeric particulates exhibit a much reduced propensity to settle (as compared to conventional proppant or sand control particulates), particularly in highly deviated or horizontal wellbore sections.

In this regard, the particulates derived from cashew nut shell liquids may be advantageously employed in any deviated well having an angle of deviation of between about 0° and about 90° with respect to the vertical. However, in one embodiment, the polymeric particulates may be advantageously employed in horizontal wells, or in deviated wells having an angle with respect to the vertical of between about 30° and about 90°, alternatively between about 75° and about 90°.

The particulates derived from cashew nut shell liquids may be introduced as part of a treating fluid into a well down wellbore tubulars (e.g., tubing, workstring, casing, drill pipe) or down coiled tubing. Advantageously the polymeric particulates may be used as a substantially neutrally buoyant proppant or sand control particulate in light or heavy brines, thus eliminating the need for complex crosslinked fracturing or sand control carrier fluids.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the lightweight and/or substantially neutrally buoyant polymeric particulates and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the lightweight and/or substantially neutrally buoyant particulates. In the latter case, the balance of the particulate material of the slurry may be another material, such as a conventional gravel pack or sand control particulate.

As an alternative to use of a screen, the sand control method may use the lightweight polymeric and/or substantially neutrally buoyant particulates derived from cashew nut shell liquids in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

EXAMPLES

Samples

Phenol formaldehyde samples derived from CNSL were obtained from CARDOLITE. The characteristics of the samples are shown in Table 1.

TABLE 1

|  | Phenol formaldehyde Sample A | Phenol formaldehyde Sample B |
| --- | --- | --- |
| Apparent Density (g/cc) | 1.05 | 1.07 |
| Bulk Density (g/cc) | 0.43 | 0.44 |
| Sphericity | 0.68 | 0.67 |
| Roundness | 0.37 | 0.38 |

TABLE 1-continued

|  | Phenol formaldehyde Sample A | Phenol formaldehyde Sample B |
| --- | --- | --- |
| Size (mesh/mesh) | 20/40 | 30/50 |
| D50 (microns) | 579 | 413 |

Stability Tests

The test sample particles were taken from the #40 screen mesh. A 60 grams sample was put in diesel and another 60 grams sample was put in HCl solution and incubated at 120° F. for three days. Each day the samples were visually checked. No changes were observed. After three days at 120° F., the samples were taken out and checked for signs of degradation. For both set of samples, there were no signs of softening.

Solubility Tests

The solubility of Samples A and B in an aqueous solution containing 12% hydrochloric acid and 3% hydrofluoric acid was tested at 150° F. Three runs were performed for each sample. The average solubility for sample A was 0.55%, and the average solubility for sample B was 0.45%. The results indicate that samples A and B are very stable in acidic conditions even at an elevated temperature.

Crush Tests

Samples A and B were tested for crush strength in accordance with API RP 60 (1995). The crush strength of samples A and B was tested by compressing a sample, which weighs 9.4 grams, in a test cylinder (having a diameter of 3.8 cm (1.5 in) as specified in API RP60) for 2 minutes at 62.4 MPa (9050 psi) and 23° C. After compression, percent fines generated and agglomeration of the particulates were determined. The test results are shown in Table 2.

TABLE 2

| Sample | Stress (psi) | % Fines (average) |
| --- | --- | --- |
| A | 6,000 | 0.78 |
| B | 6,000 | 0.92 |
| A | 8,000 | 1.06 |
| B | 8,000 | 1.15 |
| A | 10,000 | 1.15 |
| B | 10,000 | 1.19 |
| A | 12,000 | 1.10 |
| B | 12,000 | 1.52 |
| A | 14,000 | 1.33 |
| B | 14,000 | 1.79 |
| A | 16,000 | 1.84 |
| B | 16,000 | 1.93 |

The results indicate that samples A and B have excellent crush strength, exhibiting a crush strength resulting in 2% or less maximum fines generated at closure pressures ranging from 6,000 to 16,000 psi.

Conductivity Tests

Conductivity tests were performed according to a modified API RP 61 (1989) using an API conductivity cell with Ohio sandstone wafer side inserts to simulate the producing formation. A multilayer pack of a composite containing about 0.4 g of sample A was then loaded between the sealed sandstone wafers to increase the propped width resulting in a partial monolayer of 0.02 lb/sq.ft. The proppant pack exhibited a bulk density of about 0.07 g/cc. Conductivity tests were performed on sample A at varying temperatures. Experimental parameters and results are shown in Table 3 as well as FIGS. 1 and 2.

TABLE 3

Figure 1:
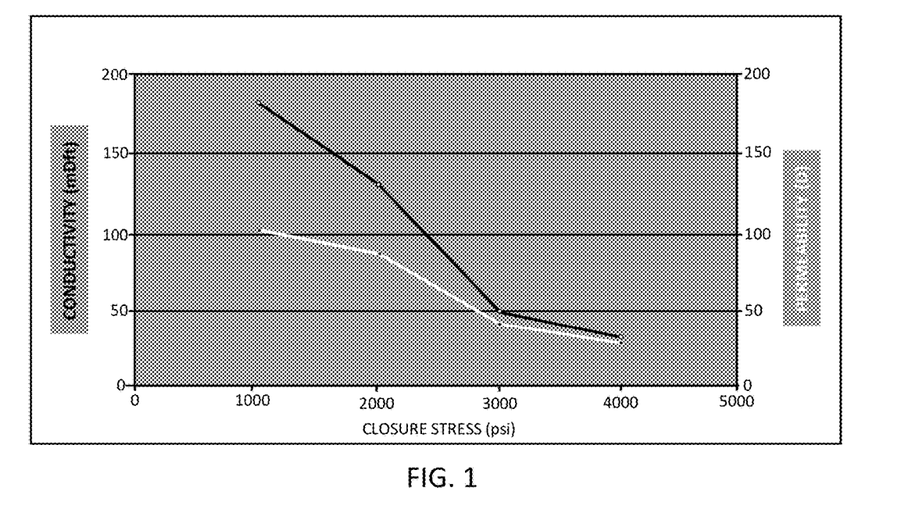
FIG. 1 is a graph showing the conductivity and permeability as a function of closure stress.
Figure 2:
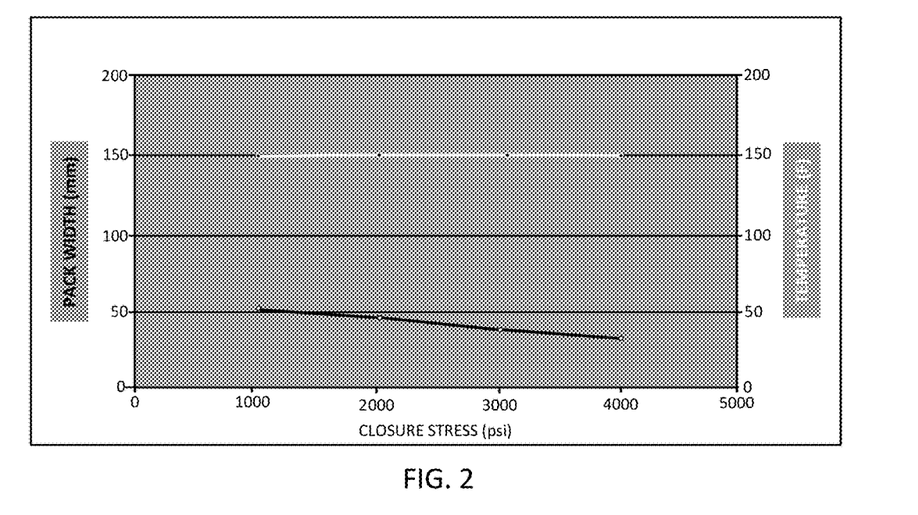
FIG. 2 is a graph showing the pack width as a function of closure stress at different temperatures.

| Time hours | Temperature ° F. | Stress psi | Width mm | Conductivity mDft | Permeability D |
|---|---|---|---|---|---|
| 0 | 150 | 1,000 | 0.64 | 300 | 143 |
| 100 | 150 | 1,000 | 0.54 | 183 | 104 |
| 0 | 150 | 2,000 | 0.50 | 161 | 98 |
| 100 | 150 | 2,000 | 0.45 | 129 | 88 |
| 0 | 150 | 3,000 | 0.41 | 84 | 62 |
| 100 | 150 | 3,000 | 0.38 | 49 | 39 |
| 0 | 150 | 4,000 | 0.36 | 41 | 35 |
| 100 | 150 | 4,000 | 0.35 | 31 | 27 |

The data indicates that the conductivity increases when the stress level decreases. It is contemplated that when substantially spherical polyester particulates are used, the conductivity at higher stress levels can be improved.

Set forth below are various embodiments of the disclosure.

Embodiment 1. A method of fracturing a subterranean formation, the Embodiment comprising: introducing into the formation at a pressure sufficient to create or enlarge a fracture in the formation a fracturing composition comprising a carrier and a polymeric particulate derived from a cashew nut shell liquid, the polymeric particulate having an apparent specific gravity of less than about 2.4.

Embodiment 2. The method of Embodiment 1, wherein the polymeric particulate derived from a cashew nut shell liquid comprises a thermoset polymer, a thermoplastic polymer, or a combination comprising at least one of the foregoing.

Embodiment 3. The method of Embodiment 1 or Embodiment 2, wherein the polymeric particulate comprises a phenol formaldehyde derived from a cashew nut shell liquid, a polyester derived from a cashew nut shell liquid, or a combination comprising at least one of the foregoing.

Embodiment 4. The method of Embodiment 3, wherein the phenol formaldehyde is derived from formaldehyde and a cashew nut shell liquid comprising cardanol.

Embodiment 5. The method of Embodiment 3 or Embodiment 4, wherein the phenol formaldehyde is crosslinked or cured.

Embodiment 6. The Embodiment of claim 3, wherein the polyester is polymerized from a monomer composition comprising a bisphenol derived from a cashew nut shell liquid and an acid component comprising one or more of the following terephthalic acid, isophthalic acid, or a derivative thereof.

Embodiment 7. The method of any one of Embodiments 1 to 6, wherein the polymeric particulate has a crush strength of 5% or less maximum generated fines as measured in accordance with American Petroleum Institute (API) RP 60 at a closure pressures of 16,000 psi.

Embodiment 8. The method of any one of Embodiments 1 to 7, wherein the polymeric particulate is substantially spherical.

Embodiment 9. The method of any one of Embodiments 1 to 8, wherein the polymeric particulate comprises particles having a size of about 250 microns to about 900 microns.

Embodiment 10. The method of any one of Embodiments 1 to 9, wherein the polymeric particulate further comprises a non-reactive filler.

Embodiment 11. The method of any one of Embodiments 1 to 10, wherein the carrier is an aqueous carrier, an oil based carrier, or an energized fluid.

Embodiment 12. The method of any one of Embodiments 1 to 11, wherein the polymeric particulate is introduced into the formation at a concentration sufficient to achieve a partial monolayer fracture.

Embodiment 13. A method of fracturing a subterranean formation, the Embodiment comprising: introducing into the formation a slurry containing a carrier and a polymeric particulate derived from a cashew nut shell liquid at a pressure sufficient to create or enlarge fractures in the formation, the polymeric particulate having an apparent specific gravity of less than about 2.4; and forming in the created fracture a proppant pack comprising the polymeric particulate, wherein the proppant pack is permeable to fluids produced from the wellbore and substantially prevents or reduces production of formation materials from the formation into the wellbore.

Embodiment 14. The method of Embodiment 13, wherein a partial monolayer is created in the fracture by the proppant pack.

Embodiment 15. A sand control Embodiment for a wellbore penetrating a subterranean formation, comprising: introducing into the wellbore a slurry of a polymeric particulate derived from a cashew nut shell liquid and a carrier, the polymeric particulate having an apparent specific gravity (ASG) of less than about 2.4; and placing the polymeric particulate adjacent the subterranean formation to form a fluid-permeable pack capable of reducing or substantially preventing the passage of formation particles from the subterranean formation into the wellbore while allowing passage of formation fluids from the subterranean formation into the wellbore.

Embodiment 16. The method of Embodiment 15, wherein the polymeric particulate derived from a cashew nut shell liquid comprises a thermoset polymer, a thermoplastic polymer, or a combination comprising at least one of the foregoing.

Embodiment 17. The method of Embodiment 15 or Embodiment 16, wherein the polymeric particulate comprises a phenol formaldehyde derived from a cashew nut shell liquid, a polyester derived from a cashew nut shell liquid, or a combination comprising at least one of the foregoing.

Embodiment 18. The method of Embodiment 17, wherein the phenol formaldehyde is derived from formaldehyde and a cashew nut shell liquid comprising cardanol.

Embodiment 19. The method of Embodiment 17 or Embodiment 18, wherein the phenol formaldehyde is crosslinked or cured.

Embodiment 20. The method of Embodiment 17, wherein the polyester is polymerized from a monomer composition comprising a bisphenol derived from a cashew nut shell liquid and an acid component comprising one or more of the following terephthalic acid, isophthalic acid, or a derivative thereof.

Embodiment 21. The method of any one of Embodiments 15 to 20, wherein the polymeric particulate further comprises a non-reactive filler.

Embodiment 22. The method of any one of Embodiments 15 to 21, wherein the carrier is an aqueous carrier, an oil based carrier, or an energized fluid.

Embodiment 23. The method of any one of Embodiments 15 to 22, wherein, prior to introduction of the polymeric particulate into the wellbore, a screen assembly is disposed within the wellbore such that at least a portion of the screen assembly is disposed adjacent the subterranean formation.

Embodiment 24. The method of any one of Embodiments 15 to 23, wherein a gravel pack screen is further introduced into the wellbore.

All ranges disclosed herein are inclusive of the endpoints, and the endpoints are independently combinable with each other. "Or" means "and/or." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of fracturing a subterranean formation, the method comprising: introducing into the formation at a pressure sufficient to create or enlarge a fracture in the formation a fracturing composition comprising a carrier and a polymeric particulate having an apparent specific gravity of less than about 2.4, wherein the polymeric particulate has a particle size of about 10 to 200 mesh and is derived from a cashew nut shell liquid.

2. The method of claim 1, wherein the polymeric particulate comprises a thermoset polymer, a thermoplastic polymer, or a combination comprising at least one of the foregoing.

3. The method of claim 1, wherein the polymeric particulate comprises a phenol formaldehyde derived from the cashew nut shell liquid, a polyester derived from the cashew nut shell liquid, or a combination comprising at least one of the foregoing.

4. The method of claim 3, wherein the polymeric particulate comprises the phenol formaldehyde, and the phenol formaldehyde is derived from formaldehyde and the cashew nut shell liquid, the cashew nut shell liquid comprising cardanol.

5. The method of claim 3, wherein the polymeric particulate comprises the phenol formaldehyde, and the phenol formaldehyde is crosslinked or cured.

6. The method of claim 3, wherein the polymeric particulate comprises the polyester, and the polyester is polymerized from a monomer composition comprising a bisphenol derived from the cashew nut shell liquid and an acid component comprising one or more of the following terephthalic acid, isophthalic acid, or a derivative thereof.

7. The method of claim 1, wherein the polymeric particulate has a crush strength of 5% or less maximum generated fines as measured in accordance with American Petroleum Institute (API) RP 60 at a closure pressures of 16,000 psi.

8. The method of claim 1, wherein the polymeric particulate is substantially spherical.

9. The method of claim 1, wherein the polymeric particulate comprises particles having a size of about 250 microns to about 900 microns.

10. The method of claim 1, wherein the polymeric particulate further comprises a non-reactive filler.

11. The method of claim 1, wherein the carrier is an aqueous carrier, an oil based carrier, or an energized fluid.

12. The method of claim 1, wherein the polymeric particulate is introduced into the formation at a concentration sufficient to achieve a partial monolayer fracture.

13. The method of claim 1, wherein the polymeric particulate comprises greater than about 70 wt % of a polymer derived from the cashew nut shell liquid, based on the total weight of the polymeric particulate.

14. The method of claim 1, wherein the polymeric particulate comprises greater than about 90 wt % of a polymer derived from the cashew nut shell liquid, based on the total weight of the polymeric particulate.

15. A method of fracturing a subterranean formation, the method comprising:
introducing into the formation a slurry containing a carrier and a polymeric particulate having an apparent specific gravity of less than about 2.4 at a pressure sufficient to create or enlarge fractures in the formation, wherein the polymeric particulate has a particle size of about 10 to 200 mesh and is derived from a cashew nut shell liquid; and
forming in the created fracture a proppant pack comprising the polymeric particulate, wherein the proppant pack is permeable to fluids produced from the wellbore and substantially prevents or reduces production of formation materials from the formation into the wellbore.

16. The method of claim 15, wherein a partial monolayer is created in the fracture by the proppant pack.

17. A sand control method for a wellbore penetrating a subterranean formation, comprising:
introducing into the wellbore a slurry of a polymeric particulate having an apparent specific gravity (ASG) of less than about 2.4 and a carrier, wherein the polymeric particulate has a particle size of about 10 to 200 mesh and is derived from a cashew nut shell liquid; and
placing the polymeric particulate adjacent the subterranean formation to form a fluid-permeable pack capable of reducing or substantially preventing the passage of formation particles from the subterranean formation into the wellbore while allowing passage of formation fluids from the subterranean formation into the wellbore.

18. The method of claim 17, wherein the polymeric particulate comprises a thermoset polymer, a thermoplastic polymer, or a combination comprising at least one of the foregoing.

19. The method of claim 17, wherein the polymeric particulate comprises a phenol formaldehyde derived from the cashew nut shell liquid, a polyester derived from the cashew nut shell liquid, or a combination comprising at least one of the foregoing.

20. The method of claim 19, wherein the polymeric particulate comprises the phenol formaldehyde, and the phenol formaldehyde is derived from formaldehyde and the cashew nut shell liquid, the cashew nut shell liquid comprising cardanol.

21. The method of claim 19, wherein the polymeric particulate comprises the phenol formaldehyde, and the phenol formaldehyde is crosslinked or cured.

22. The method of claim 19, wherein the polymeric particulate comprises the polyester, and the polyester is polymerized from a monomer composition comprising a bisphenol derived from the cashew nut shell liquid and an acid component comprising one or more of the following terephthalic acid, isophthalic acid, or a derivative thereof.

23. The method of claim 17, wherein the polymeric particulate further comprises a non-reactive filler.

24. The method of claim 17, wherein the carrier is an aqueous carrier, an oil based carrier, or an energized fluid.

25. The method of claim 17, wherein, prior to introduction of the polymeric particulate into the wellbore, a screen assembly is disposed within the wellbore such that at least a portion of the screen assembly is disposed adjacent the subterranean formation.

* * * * *